No. 848,009. PATENTED MAR. 26, 1907.
L. D. CASTLE.
GATE VALVE.
APPLICATION FILED MAY 11, 1906.
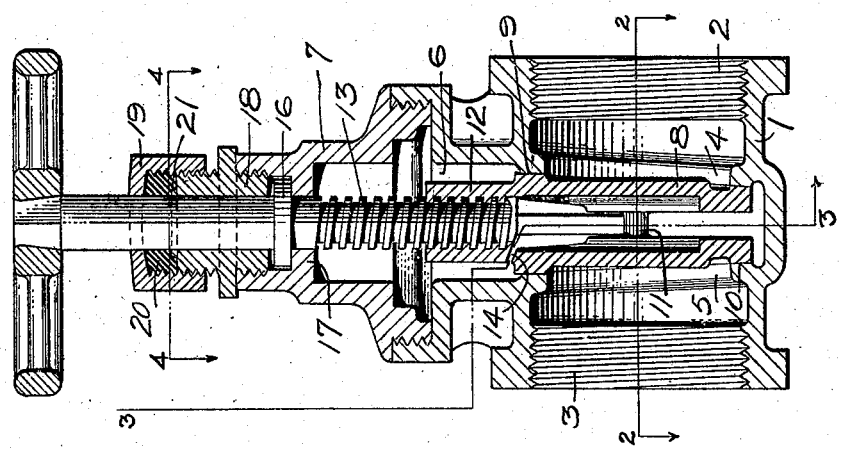
WITNESSES.
INVENTOR.

UNITED STATES PATENT OFFICE.

LEWIS D. CASTLE, OF BARBERTON, OHIO, ASSIGNOR TO PITTSBURGH VALVE AND FITTINGS COMPANY, OF PITTSBURG, PENNSYLVANIA, A CORPORATION OF NEW JERSEY.

GATE-VALVE.

No. 848,009.        Specification of Letters Patent.        Patented March 26, 1907.

Original application filed September 25, 1905, Serial No. 280,035. Divided and this application filed May 11, 1906. Serial No. 316,379.

*To all whom it may concern:*

Be it known that I, LEWIS D. CASTLE, a resident of Barberton, in the county of Summit and State of Ohio, have invented a new and useful Improvement in Gate-Valves; and I do hereby declare the following to be a full, clear, and exact description thereof.

This invention relates to gate or straightway valves, and especially to valves of this type of small size.

The object is to provide a valve of this character in which the nut or cap holding the packing in the stuffing-box in place is prevented from being worked loose by the rotation of the valve-actuating screw.

In all straightway or gate valves the rotation of the actuating-screw is liable to cause the packing in the stuffing-box to rotate with the screw, and this has a tendency to unscrew or loosen the nut or cap, which forces the packing into position. Heretofore it has been proposed to overcome this by providing a polygonal bearing-block on the end of the bonnet or hood, so that the packing will be forced down around this polygonal bearing-block, and thus prevented from rotating with the screw. All such bearing-blocks as heretofore constructed have been provided with angles, which cut into the packing and help to destroy the same.

The object of my invention is to provide a bearing-block which has curved faces nonconcentric with the spindle, preferably elliptical, and which does not cut the packing material.

In the accompanying drawing, Figure 1 is a vertical longitudinal section through a valve provided with my improvement, and Fig. 2 is a detail view of the bearing-block.

The particular valve shown has a body or casing 1, which may be of the usual or any preferred construction, the same being provided with an inlet-port 2, outlet-port 3, and with the seats 4 and 5, which face in opposite directions and which preferably are inclined, as shown, so as to form a wedge-shaped space therebetween. On the upper side of the body is an opening 6, threaded internally, as shown, and in which is secured the threaded lower end of the bonnet or hood 7.

The disk 8 is formed of a single casting or the like and is provided with disk faces 9 and 10, having seats for coöperating with the seats 4 and 5. These face-disks are unconnected with each other, except for the ligaments or columns 11, located near the centers of said disks. One of these disks is provided with a projection 12 for the attachment of the actuating-screw 13; but the other disk is separated therefrom by means of the kerf 14. These disks, projection 12, and ligaments or columns 11 are formed as an integral casting, and the kerf 14 is afterward cut.

The construction of the valve so far described is not claimed in this application, but is claimed in my application filed September 25, 1905, Serial No. 280,035, of which this application is a division.

The screw 13 has a threaded engagement with the sleeve or projection 12 on the disk. It passes up through an unthreaded opening in the bonnet and is provided with a collar 16, which is held between a ledge 17 in the bonnet and the lower end of a sleeve-nut 18, screwed into the upper end of the bonnet. In case a traversing screw is used the lower end is attached to the disk and it passes up through a threaded opening in the bonnet. In that case the sleeve-nut 18 is a part of the bonnet.

The sleeve-nut 18 or the upper end of the bonnet, as the case may be, is externally threaded to receive the packing cap or nut 19, which serves to force the packing material 20 tightly around the spindle to form the stuffing-box. The upper end of the sleeve-nut 18 or bonnet is provided with a bearing-block 21, which is of less diameter than the internal diameter of the cap 19 and which has curved edge portions non-concentric with the spindle-opening, either being eccentric to said opening or elliptical, as shown in the drawings. The cap 19 forces the packing material 20 into the space around this bearing-block, and as the faces thereof are non-concentric with the screw the rotation of the latter cannot rotate said packing, and consequently the nut or cap is prevented from working loose. At the same time the curved edges of the bearing-block do not cut the packing and destroy the same.

What I claim is—

1. In a valve, the combination of a bonnet or hood provided with an externally-threaded projection having an opening therethrough, a valve-actuating screw extending through said opening, a cap fitting on said threaded projection, and packing material inclosed by said cap, said projection having a bearing-block projecting beyond the same and of smaller diameter than the cap and being provided with curved faces non-concentric with the axis of the actuating-screw.

2. In a valve, the combination of a bonnet or hood having an externally-threaded projection having an opening therethrough, a valve-actuating screw extending through said opening, a packing-cap fitting on said threaded projection, and packing material inclosed by said cap, said threaded projection having a bearing-block projecting beyond the same and of smaller diameter than the interior of said cap and being provided with elliptical side faces.

In testimony whereof I, the said LEWIS D. CASTLE, have hereunto set my hand.

LEWIS D. CASTLE.

Witnesses:
S. A. DECKER,
W. A. MORTON.